T. N. RUSSELL.
CAR ROOF.
APPLICATION FILED OCT. 15, 1919.
1,410,513.
Patented Mar. 21, 1922.
7 SHEETS—SHEET 1.
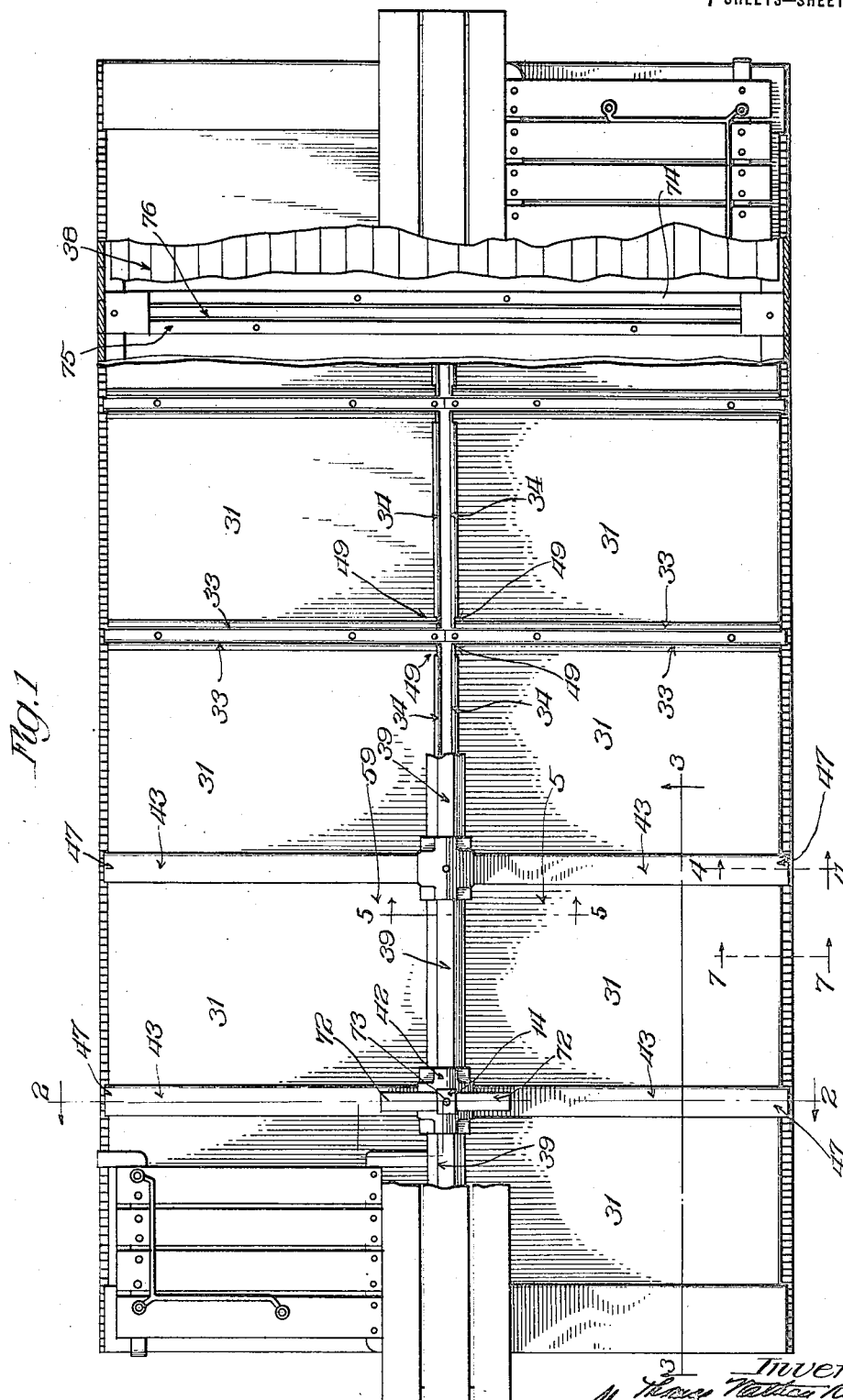

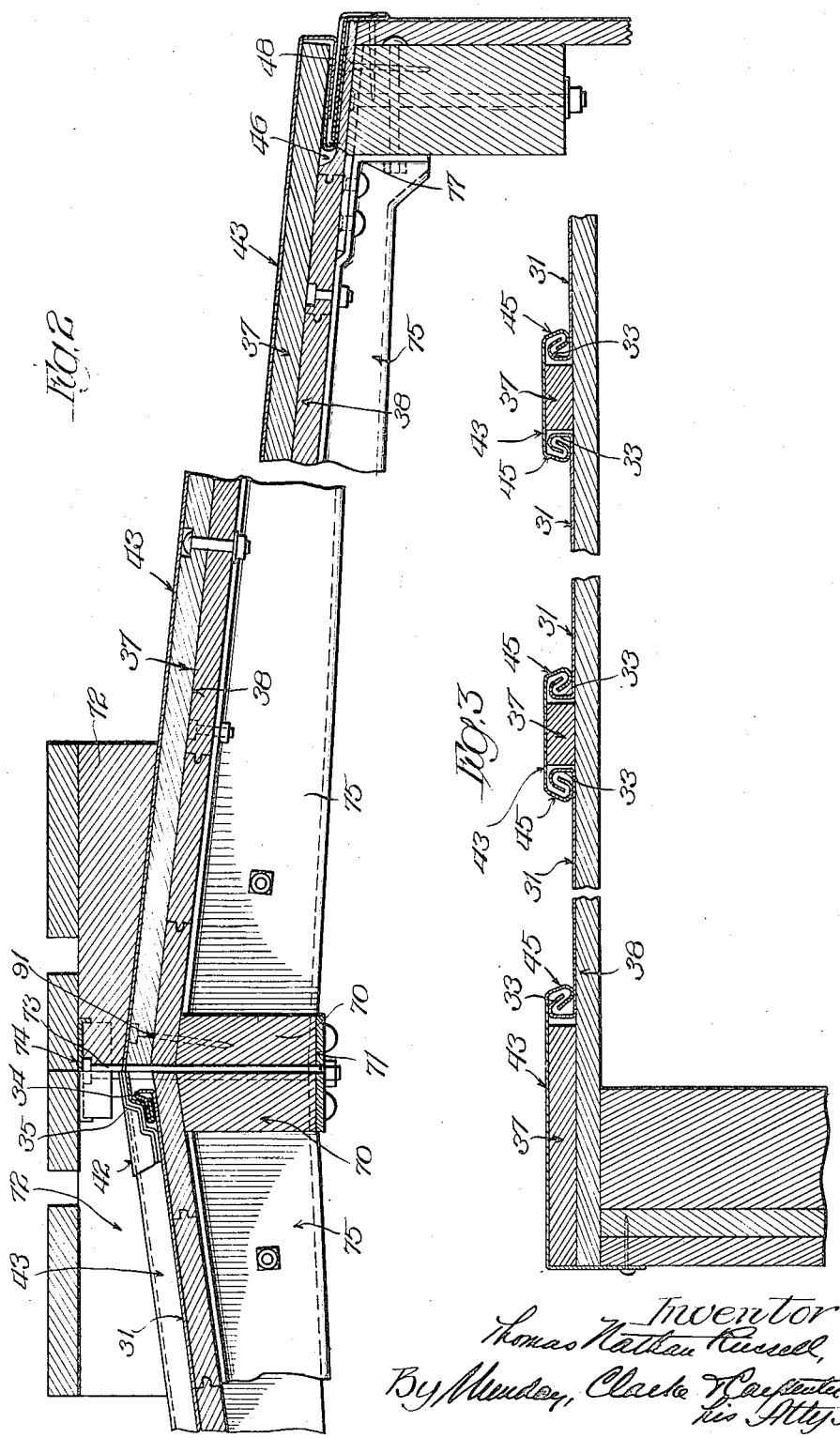

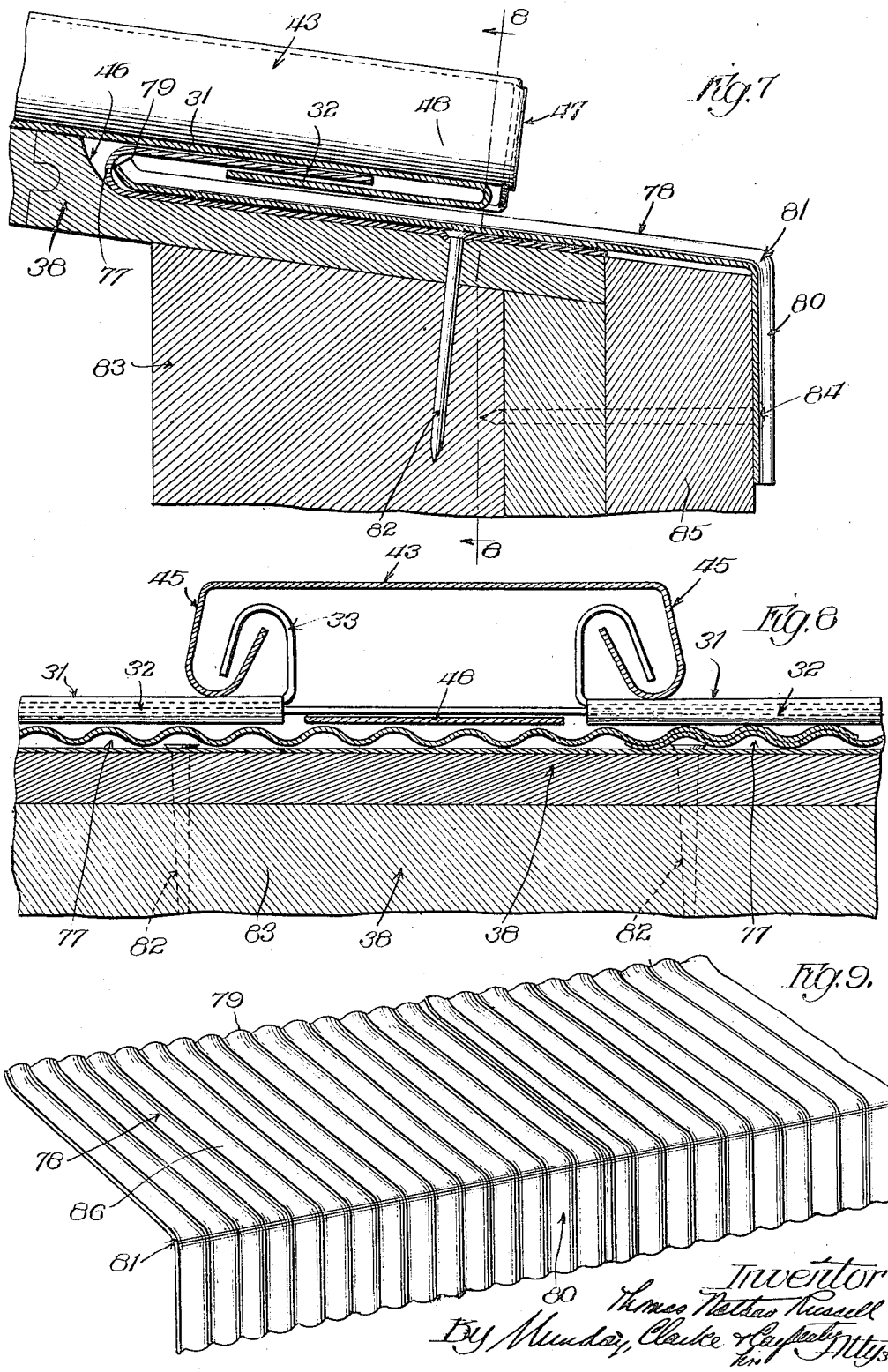

T. N. RUSSELL.
CAR ROOF.
APPLICATION FILED OCT. 15, 1919.
1,410,513.
Patented Mar. 21, 1922.
7 SHEETS—SHEET 5.
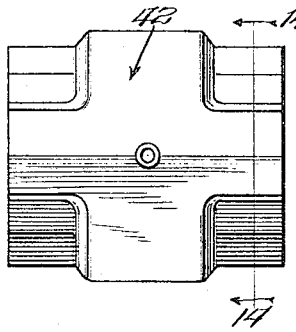
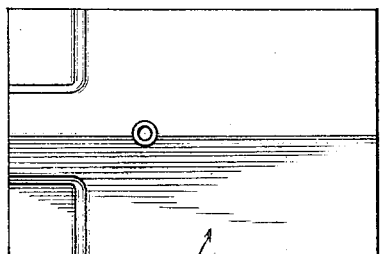
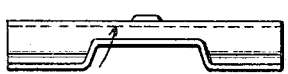
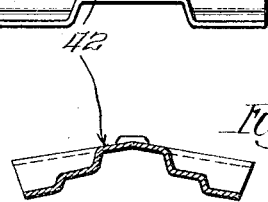
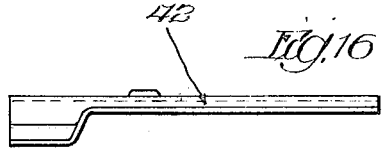
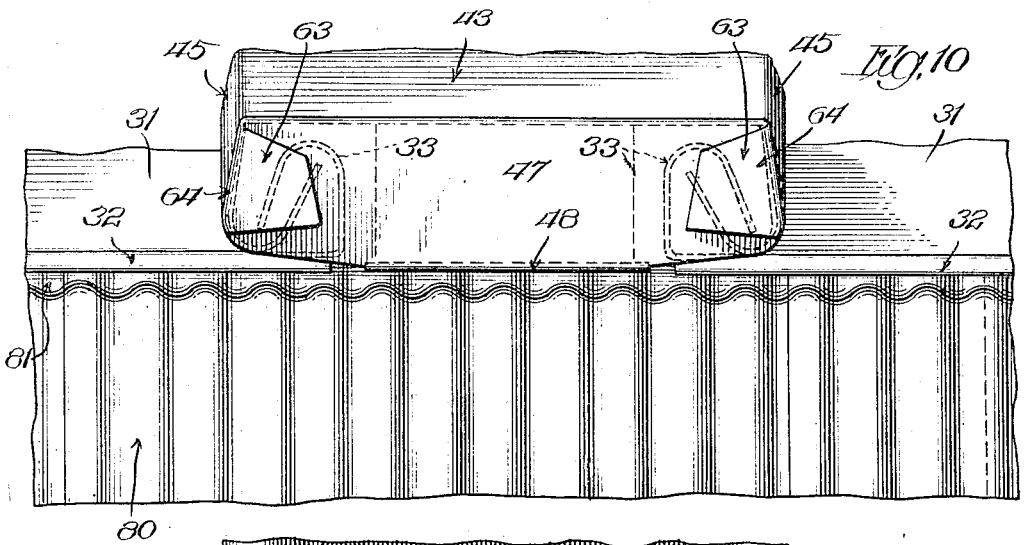
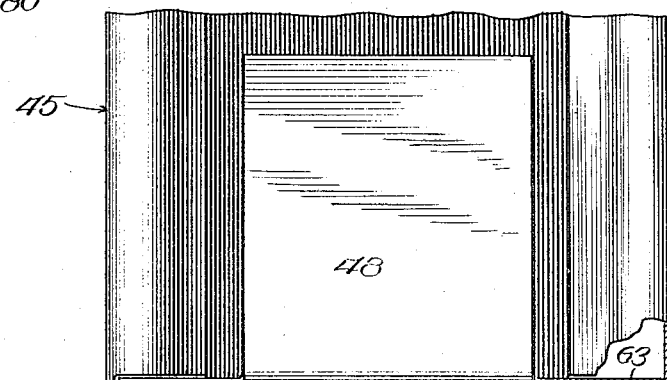

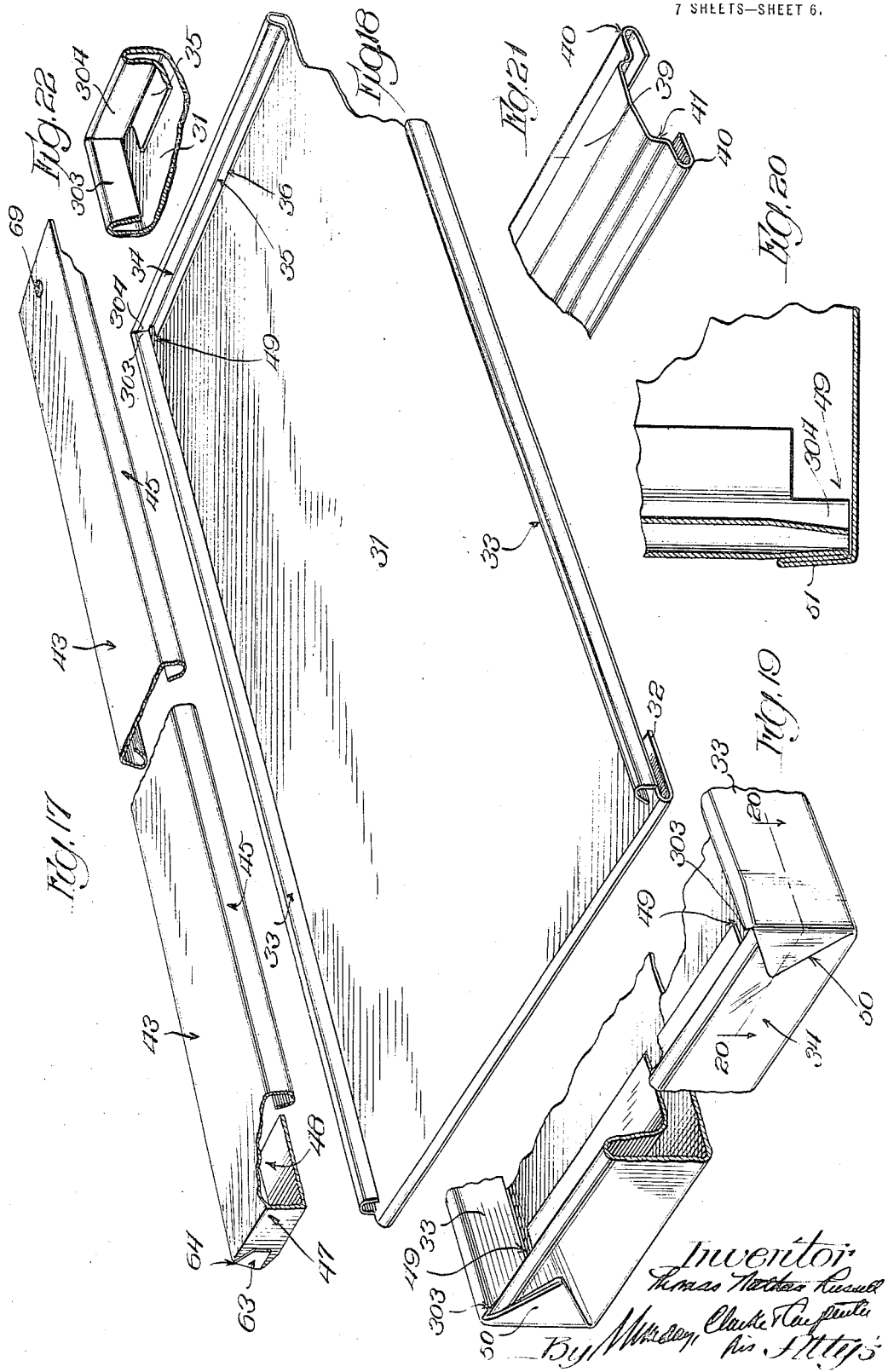

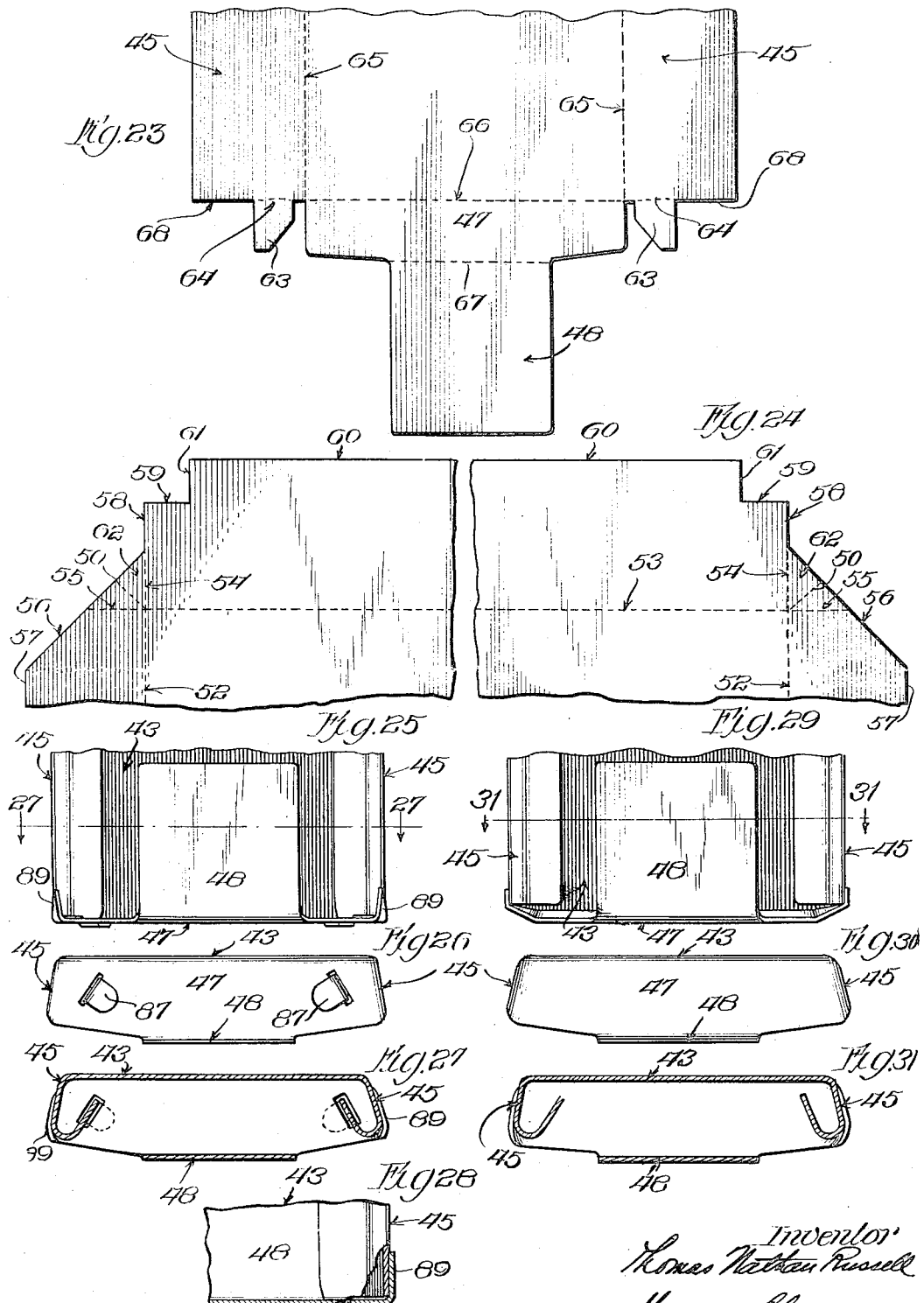

UNITED STATES PATENT OFFICE.

THOMAS NATHAN RUSSELL, OF CHICAGO, ILLINOIS, ASSIGNOR TO CHICAGO-CLEVE-LAND CAR ROOFING COMPANY, OF CHICAGO, ILLINOIS, A CORPORATION OF ILLINOIS.

CAR ROOF.

1,410,513.  Specification of Letters Patent.  Patented Mar. 21, 1922.

Application filed October 15, 1919. Serial No. 330,701.

*To all whom it may concern:*

Be it known that I, THOMAS NATHAN RUSSELL, a citizen of the United States, residing in Chicago, in the county of Cook and State of Illinois, have invented a new and useful Improvement in Car Roofs, of which the following is a specification.

This invention relates to car roofs of the "outside metal type," and has for an object the provision of an improved outside metal roof construction having novel characteristics as follows: The ridge corners of the roof-sheets are provided with exceptionally strong mitre joints that are substantially water tight; the eaves-ends of the mullion-caps are made with strong substantially watertight joints; and the eaves-flashings are of such a construction that water running down the roof of the car is invariably spilled off the eaves. The invention has for other objects such other advantages and results as may be found to obtain in the structures hereinafter set forth or claimed.

In the accompanying drawings, forming a part of this specification, and showing, for purposes of exemplification, a preferred form and manner in which the invention may be embodied and practised, but without limiting the claimed invention specifically to such illustrative instance or instances:—

Figure 1 is a top plan view of a car roof constructed in accordance with the invention;

Fig. 2 is a vertical transverse sectional elevation taken in planes indicated by the line 2—2 of Fig. 1;

Fig. 3 is a vertical longitudinal sectional elevation taken in a plane indicated by the line 3—3 of Fig. 1;

Fig. 7 is an enlarged detail vertical sectional elevation through the eave-flashing taken in a plane indicated by the line 7—7 of Fig. 1;

Fig. 8 is a sectional elevation taken in planes indicated by the line 8—8 of Fig. 7;

Fig. 9 is a perspective view illustrating the construction of the eave-flashing;

Fig. 10 is an enlarged fragmentary side elevation of the eave-flashing and the eaves-end of the mullion-cap;

Fig. 11 is a bottom plan view of a mullion-cap with one of the eaves corners in section;

Fig. 12 is a plan view of a corner-cap;

Fig. 13 is a side elevation of the corner cap illustrated in Fig. 12;

Fig. 14 is a section taken in the plane indicated by the line 14—14 of Fig. 12;

Fig. 15 is a plan view of an end corner-cap;

Fig. 16 is a side elevation of the end corner-cap registered in Fig. 15;

Fig. 17 is a detailed perspective and sectional view of a mullion-cap;

Fig. 18 is a perspective of a roof-sheet.

Fig. 19 is a perspective and sectional view of the ridge end of the roof-sheet illustrating the ridge corners.

Fig. 20 is a section through the ridge corner of a roof-sheet taken in a plane indicated by the line 20—20 of Fig. 19;

Fig. 21 is a fragmentary perspective of a ridge-cap;

Fig. 22 is a fragmentary perspective looking inwardly at the ridge corner of a roof-sheet;

Fig. 23 is a plan view of the eaves end of a blank for forming a mullion-cap illustrated in previously identified figures;

Fig. 24 is a plan view of the ridge end of a blank for forming a roof-sheet;

Fig. 25 is a bottom plan view of the eaves end of a mullion-cap of modified construction;

Fig. 26 is an elevation of the eaves end of the mullion-cap illustrated in Fig. 24;

Fig. 27 is a vertical section taken in a plane indicated by the line 27—27 of Fig. 25;

Fig. 28 is a detailed plan view partly in section of the eaves corner of the mullion-cap illustrated in Fig. 24;

Fig. 29 is a bottom plan view of the eaves end of a further modified form of mullion-cap;

Fig. 30 is an elevation of the eaves end of the mullion-cap illustrated in Fig. 28; and Fig. 31 is a vertical section, taken in a plane indicated by the line 31—31 of Fig. 29.

The same characters of reference indicate the same parts throughout the several views.

Figure 4:
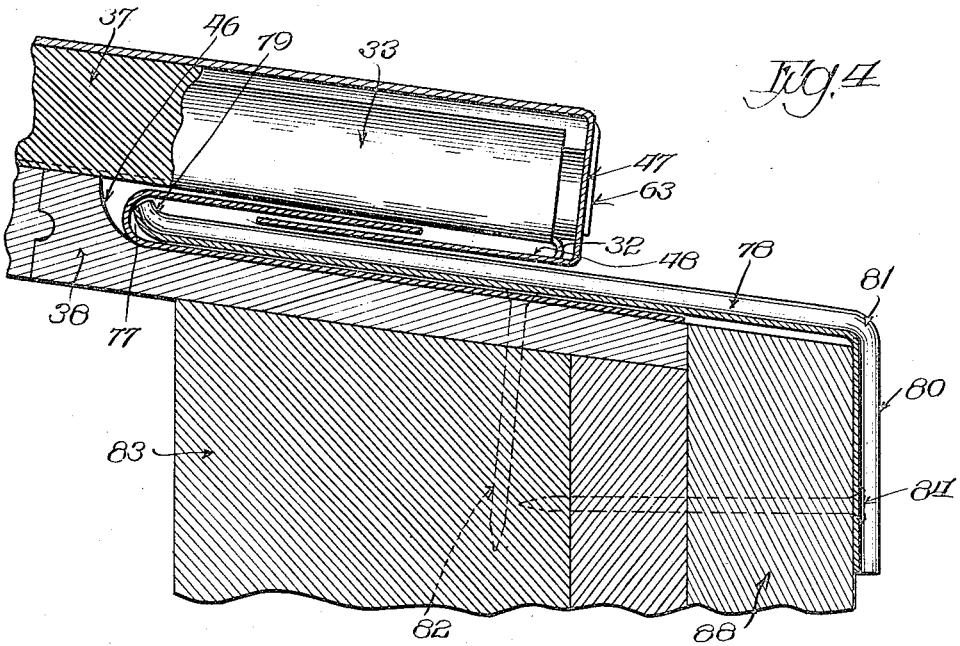
Fig. 4 is an enlarged vertical sectional elevation through the eaves end of a mullion-cap and the eave-flashing, taken in a plane indicated by the line 4—4 of Fig. 1.
Figure 5:
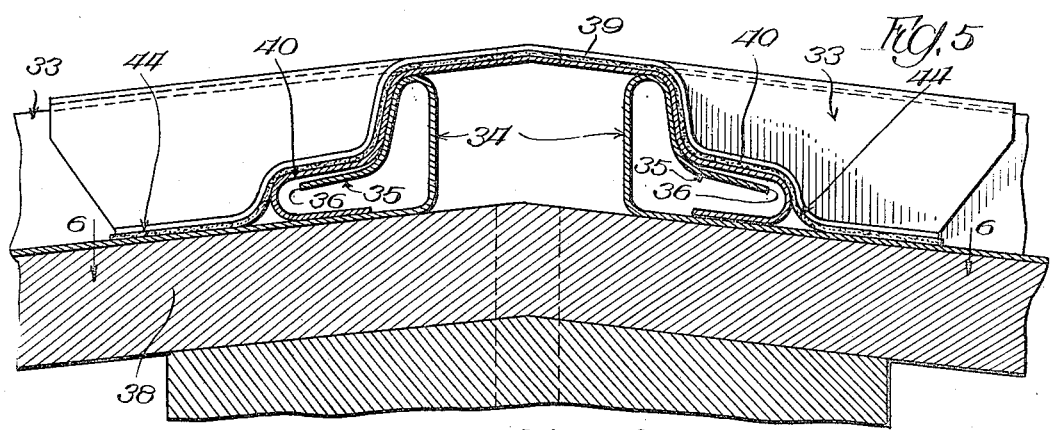
Fig. 5 is an enlarged detail transverse sectional elevation of the ridge construction taken in a plane indicated by the line 5—5 of Fig. 1.
Figure 6:
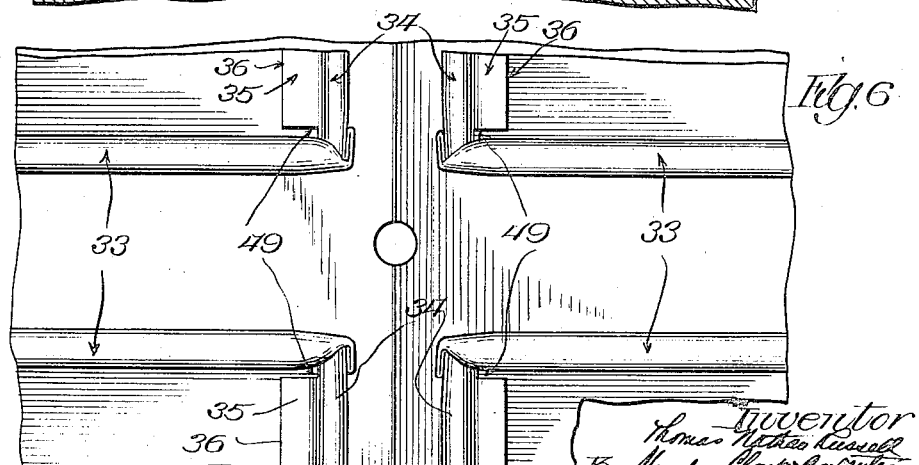
Fig. 6 is an enlarged fragmentary plan view illustrating the ridge corners of the roof-sheets.

In the illustrated embodiment of the invention, the roof-sheets are indicated at 31—31 and each roof-sheet is formed with an underbent hooked flange 32 along its eaves-end and with an upstanding inwardly rebent flange 33 along each of its sides. Formed along the ridge-end of each roof-sheet is a flange 34 that is upwardly bent and inwardly rebent and shouldered, as shown at 35, the free edge 36 of the shoulder 35 extending inwardly over the body of the roof-sheet. The several roof-sheets 31 are disposed in pairs on opposite sides of the ridge of the car-roof, as shown more particularly in Fig. 1, and occupy the spaces between the transverse mullions 37 which are nailed on the top of the wooden roof-sheathing 38 at suitable intervals along the roof. In practice, the intervals between the successive mullions 37 are somewhat wider than the overall width of the roof-sheets that occupy the spaces between these mullions, in order to provide free spaces in which each roof-sheet may move laterally between the mullions on either side of it. Extending along the ridge of the roof, between the mullions, are ridge-caps 39 of inverted channel form, as shown more particularly in Fig. 21, and provided with outwardly extending and inwardly rebent flanges 40 along each edge of the channel 41. The channel 41 of the ridge-caps overlies and engages the aforesaid shoulders 35, and the rebent edge-flanges 40 of the ridge-caps are hooked freely over the aforesaid free edges 36 of the shoulder portion of the roof-sheet flanging. This interlocked engagement of the ridge-caps with the ridge-flanges of the roof-sheets retains the roof-sheets from displacement from the eaves of the roof and yet permits them freedom of movement both laterally and towards the ridge-line of the roof.

The ends of the ridge-caps are secured in position by the corner-caps 42 that are doubly shouldered to conform with and fit over the outside of the ridge-cap ends and are also recessed to fit over the adjacent ends of the seam-caps 43 that cap the mullions 37. Interposed between the corner caps 42 and the ridge-cap ends and the adjacent ends of the seam-caps 43 are sheets 44 of flexible waterproof material, such as heavy canvas, that make tight and waterproof the joints, and also prevent abrasion of the parts during their movement relative to each other. The seam-caps or mullion-caps are formed with depending lateral flanges 45 that considerably overhang the sides of the mullions and are downwardly and inwardly rebent so that they may be telescoped into and loosely engaged with the aforesaid upstanding side-flanges 33 of the roof-sheets, to permit free movement of said roof-sheets toward and away from the mullions.

At their eaves-end, the mullions 37 overhang a recess 46 which is rabbeted out along the top of the eaves portion of the roof-sheathing, as shown more particularly in Figs. 2, 4 and 7; and the eaves end 47 of each mullion-cap is bent downwardly and rebent inwardly, as shown at 48, to cover the eaves ends of the engagement between the mullion-cap flanges 45 and the roof-sheet flanges 33 and also to hook under and engage the said over-hanging eaves-end of the mullion 37 (Fig. 4).

At the ridge-corners 49 located at the junctions of the aforesaid ridge-flanges 34 and side-flanges 33 of the roof-sheets, the roof-sheets are provided with mitre joints of great strength and rigidity and specially constructed to insure practical waterproof conditions at said ridge-corners. The construction of these joints is illustrated more particularly in Figs. 6, 18, 19, 20 and 22. As shown, the adjacent vertical edges of the side flanges 33 and the ridge-flanges 34 at the ridge-corners 49, are closed by integral connecting portions of metal which are respectively bent along a line 50 that is diagonal with respect to the aforesaid vertical edges to form a flap 51 of double thickness that is rebent from the vertical edge of the side-flange 33 over and against the outer vertical surface of the ridge-flange 34. At the ridge corners 49 the edges 303 of the side-flanges 33 are mitered and overlap the edges 304 of the ridge-flanges 34, eliminating open spaces between the said flanges 33 and 34, at these points which might cause leakage. The mitre joints thus formed at the junctions of the side-flanges and ridge-flanges are kept closed by the aforesaid rebent flaps 51. A metallic blank from which a roof-sheet is constructed is illustrated in Fig. 24. Referring to said figure, the scorings 52 represent the bottom lines of bend of the side flanges 33; the scoring 53 represents the bottom line of bend of the ridge-flange 34; the scorings 54 represent the vertical edges of the ridge-flange 34 at the ridge-corners 49; the scorings 55 represent the vertical edges of the side-flanges 33 at the ridge-corners. The blank is formed with diagonal or mitred edges 56 that converge inwardly from the side edges 57 toward the longitudinal center of the blank and are intersected by the scorings 55 which in a flat blank constitute extensions of the scoring 53 that indicates the bottom line of bend of the ridge-flange; these diagonal edges 56 extend to short edges 58 respectively located on opposite sides of the longitudinal center of the blank and disposed parallel with the side edges 57; the short edges 58 extend to short edges 59 perpendicular thereto and parallel with the ridge-flange edge 60; these short edges 59 are connected by short edges 61 with the ridge-flange edge 60, said edges 61 being perpendicular to said ridge-flange edge as shown. The connecting portions between the adjacent vertical edges of the side and ridge-flanges at the ridge-corners are represented by the triangular portions of metal 62 located between the scorings 54 and 55; and the mitred edges 303 of the side-flanges 33 are formed by those portions of the diagonal edges 56 between the intersecting lines 55 and 57.

In forming the roof-sheet from the above described blank, the metal is bent upwardly along the scoring 53 to form the ridge-flange 34 which is rebent in the manner shown in Figs. 18 and 19, and the metal is bent inwardly along the scorings 52 to form the side flanges 33 which are also rebent in the manner shown, so that the edges 303 of the side-flanges 33 overlap at the corners 49 the edges 304 of the ridge-flange 34. The connecting portions 62 between the adjacent vertical edges of the side-flanges and the ridge-flange become bent outwardly along the scorings 50 to form the flaps 51, which are then bent over and against the ridge-flange 33, to keep the mitre joints at the ridge corners closed.

As hereinbefore stated, the eaves-end 47 of each mullion-cap is bent downwardly and rebent inwardly to hook under the overhanging eaves end of the mullion 37. In order to provide a waterproof joint at the corners of the downwardly bent eaves-end 47 of the mullion-cap and the adjacent edges of the lateral flanges 45 of the mullion-cap, tabs 63 extend from the aforesaid adjacent edges of the depending lateral flanges 45 which tabs are bent over along the line 64 and flat against the eaves-end of the mullion-cap, so as to cover up the chink at the opposite edges of the eaves-end 47 and also the tabs form reinforcing means to hold the hook elements strongly in place (Fig. 4) and prevent them from being bent outward from under the hook strips 77–hereinafter described. This construction prevents water from getting into the inside of the mullion-caps from the eaves-end. A flat sheet metal blank from which a mullion-cap is constructed is illustrated in Fig. 23. On said blank, the scorings 65 indicate the lines of bend of the depending lateral flanges 45 which are bent downwardly from the main body of the cap; the scoring 66 indicates the line of downward bend of the eaves-end 47 of the cap and the scoring 67 indicates the line of inward bend of the portion 48 that hooks under the overhanging eaves-end of the mullion 37. The tabs 63 are bent along the scoring 64 that coincides with the corner edges 68 of the depending lateral flanges 45.

The mullion-caps are secured at the ridge by the bolts 73 that pass through holes 69 in lapping portions of the mullion-caps. The wooden ridge-poles 70 that span the space from carline to carline are secured by the underneath ridge plate 71 that extends under all the carlines. The running board saddles 72 rest on top of the corner-caps 42 and the mullions and their caps, and each saddle is secured by the bolt 73 passing down through it and through the corner-cap, mullion-caps, mullions, sheathing, ridge-pole and underneath ridge-plates 71. Over the top of the bolt 73, a small waterproof metal cap 74 is sunk into a recess in the top of the running board saddle to prevent seepage of water into the bolt-hole. It may be noted that the carlines the fewer in number than the mullion-divided spaces along the top of the roof, and therefore do not directly underlie the mullions, with the possible exception of the carlines at the middle of the length of the roof. Each carline 75 is U-shaped and extends from side to side of a car, and in its channel there is a wooden filler 76; and so where the carline underlies the mullions at the middle of the length of the car, the mullion-securing nails 91 would enter the said wooden filler of the carline and the said bolt 73 would pass through such wooden filler and at the bottom of the channel of the carline and then through the underneath ridge plate 71.

The rebent eaves-flanges 32 of the roof-sheets are loosely engaged by the hook-strips 77 that occupy the aforesaid recess 46 along the eaves portion of the roof-sheathing and are secured well within the eaves edge of such sheathing. These hook-strips 77 extend along the entire length of the said eaves recess 46 and are made in sections that lap end for end. Overlying the under portion of these hook-strips 77 and extending in between said portion and the rebent roof-sheet flange 32 that is engaged under the upper portion of the hook strips, there is an eaves-flashing 78, the inner end of which is flanged diagonally upward, as shown at 79, and the outer portion 80 of which is bent downward, as shown at 81, over the outside of the car. The hook-strips are secured by nails 82 driven through the hook-strip and roof-sheathing and into the wooden side-plate 83; and the flashings are secured in their depending portion 80 by nails 84 driven through the side-sheathing 85 into the said wooden side-plate 83.

In accordance with the invention, the flashing 78 is formed with lateral corrugations 86, i. e., corrugations parallel with the mullions 37. These corrugations 86 extend from the diagonal flange 79 along the inclined portion of the flashing over the bend 81 and downwardly along the depending portion 80 of the flashing, the corrugations of the inclined portion merging directly into the corrugations of the depending portion as shown. In practice, the flashing is formed of a plurality of sections having overlapping adjacent corrugated edges. With such a corrugated flashing, water dashing along the eaves or pouring from the roof of the car will be caught in the corrugations and carried to the eaves of the car and spilled off. The liability of water being driven along the eaves and running in on the seams or laps of the flashing sections, so as to cause leakage, is entirely eliminated as the water will pass down the valleys of the corrugations and discharge off the eaves.

The modified form of mullion-cap illustrated in Figs. 25 to 28 inclusive is provided with tabs 87 respectively projecting from eaves ends of the inwardly-rebent portions of the lateral-flanges 45. These tabs are inserted in slots 88 in the eaves end 47 of the mullion-cap and bent over the face of said eaves-end; the latter is provided, at its opposite corners with tabs 89 which are bent rearwardly against the lateral-flanges 45 to keep closed the corners of the eaves-end 47 and the adjacent edges of the lateral-flanges 45. In the further modification illustrated in Figures 29 to 31 inclusive, these corners of the eaves-end 47 and the adjacent edges of the lateral-flanges 45 of the mullion-cap are kept closed by tabs 90 extending from the corners of the eaves-end 47 and bent back against the aforesaid lateral-flanges 45.

The invention, as hereinbefore described, is embodied in a particular form of construction, but may be variously embodied within the scope of the claims hereinafter made.

I claim:

1. In a metal car-roof, in combination: roof-sheets disposed on opposite sides of the ridge of the roof and each having along its ridge-end a flange that is upwardly bent and inwardly rebent and shouldered, the free edge of the shouldered portion extending inward over the body of the sheet; a ridge-cap of inverted channel form with outwardly extending and inwardly rebent flanges along each edge of the channel, the channel being adapted to overlie and engage the faces of the aforesaid shoulders of the roof-sheet flanging, and the rebent edge-flanges of the channel being hooked freely over the aforesaid extended free edges of the roof-sheet flanging; seam caps extending transversely of the roof and freely engaging the sides of the roof-sheets; corner-caps shouldered over the mutually adjacent ends of the ridge-caps and seam-caps, to hold the ridge-caps and seam-caps in place at the ridge of the roof; and a substantially waterproof flexible filler interposed between the corner-cap and the mutually adjacent ends of the ridge-caps and seam-caps; substantially as specified.

2. In a metal car-roof, in combination: roof-sheets disposed on opposite sides of the ridge of the roof and each having along its ridge-end a flange that is upwardly bent and inwardly rebent and shouldered, the free edge of the shouldered portion extending inward over the body of the sheet; a ridge-cap of inverted channel form with outwardly extending and inwardly rebent flanges along each edge of the channel, the channel being adapted to overlie and engage the faces of the aforesaid shoulders of the roof-sheet flanging, and the rebent edge-flanges of the channel being hooked freely over the aforesaid extended free edges of the roof-sheet flanging; seam caps extending transversely of the roof and freely engaging the sides of the roof-sheets; corner-caps shouldered over the mutually adjacent ends of the ridge-caps and seam-caps, to hold the ridge-caps and seam-caps in place at the ridge of the roof; and a filler, formed of substantially waterproof, flexible, non-abrasive material, interposed between the corner-cap and the mutually adjacent ends of the ridge-caps and seam-caps; substantially as specified.

3. In a metal car-roof, in combination: roof-sheets disposed on opposite sides of the ridge of the roof, each having upwardly bent and inwardly rebent flanges along its sides, and a ridge-flange that is upwardly bent and inwardly rebent and shouldered, the free edge of the shouldered portion extending inward over the body of the sheet; the aforesaid side-flanges having mitred edges at the ridge corners which edges lap with the ridge-corner ends of the ridge-flange; a ridge-cap of inverted channel form with outwardly extending and inwardly rebent flanges along each edge of the channel, the channel being adapted to overlie and engage the faces of the aforesaid shoulders of the roof-sheet flanging, and the rebent edge-flanges of the channel being hooked freely over the aforesaid extended free edges of the roof-sheet flanging; seam caps extending transversely of the roof and freely engaging the sides of the roof-sheets; and corner-caps shouldered over the mutually adjacent ends of the ridge-caps and seam-caps, to hold the ridge-caps and seam-caps in place at the ridge of the roof; substantially as specified.

4. In a metal car roof, in combination: roof-sheets disposed on opposite sides of the ridge of the roof, each having upwardly bent and inwardly rebent flanges along its sides, and a ridge-flange that is upwardly bent and inwardly rebent and shouldered, the free edge of the shouldered portion extending inward over the body of the sheet; the aforesaid side-flanges having mitered edges at the ridge corners which edges lap with the ridge-corner ends of the ridge flange, and the side-flanges being connected with the ridge-flange by integral flaps bent over against the ridge-flange; and a ridge-cap of inverted channel form with outwardly extending and inwardly rebent flanges along each edge of the channel, the channel being adapted to overlie and engage the faces of the aforesaid shoulders of the roof-sheet flanging; substantially as specified.

5. In a car roof, in combination: roof-sheathing; mullions secured at intervals transversely along the top of said sheathing; roof-sheets occupying the spaces between said mullions, on opposite sides of the ridge of the roof; mullion-caps retaining the sides of said roof-sheets; retaining means for the eaves-ends of the roof-sheets and the mullion-caps; and a transversely corrugated flashing strip secured to the eaves independently of said retaining means; substantially as specified.

6. In a car roof, in combination: roof-sheathing; mullions secured at intervals transversely along the top of said sheathing; roof-sheets occupying the spaces between said mullions, on opposite sides of the ridge of the roof; mullion-caps retaining the sides of said roof-sheets; retaining means for the eaves-ends of the roof-sheets and the mullion-caps; and a flashing strip secured to the eaves independently of said retaining means, said flashing strip having transverse corrugations extending transversely of the roof and down the side of the car; substantially as specified.

7. In a car roof, in combination: roof-sheets having side seam flanges, and eaves hook-flanges which are bent under and inwardly; an eaves hook strip beneath which said hook-flanges of the roof sheets engage; and seam caps having side flanges interengaged with said side seam flanges of the roof sheets, said seam caps having eaves end flanges which are bent downward and inward under said eaves hook strip, and having tabs which are bent over on to the end face of said eaves end flanges to hold the hook elements thereof in place beneath the said hook strip.

8. An eaves flashing strip for railway cars, embodying, an elongated sheet of metal having a longitudinal bend to form an angular strip of metal, and provided with transverse corrugations extending from side to side of said sheet and over the bend, substantially as specified.

9. In a car roof, in combination: roof-sheathing; mullions secured at intervals transversely along the top of said sheathing; roof-sheets occupying the spaces between said mullions, on opposite sides of the ridge of the roof; mullion-caps retaining the sides of said roof-sheets; retaining means for the eaves-ends of the roof-sheets and the mullion-caps; and transversely-corrugated lapping flashing strips secured to the eaves independently of said retaining means; substantially as specified.

10. An eaves flashing strip for railway cars, embodying, an elongated sheet of metal having a longitudinal bend to form an angular strip of metal and having a reversely bent longitudinal flanged edge along one of its sides, and provided with transverse corrugations extending from side to side of said sheet and over said first mentioned bend, substantially as specified.

11. A roof-sheet for metal car roofs, embodying, a sheet having upwardly bent and inwardly rebent flanges along its sides; and a ridge flange that is upwardly bent and inwardly rebent and shouldered, the free edge of the shouldered portion extending inward over the body of the sheet; the aforesaid side flanges having mitred edges at the ridge corners which corners lap with the ridge corner ends of the ridge-flange, and the side-flanges being connected with the ridge-flange by integral flaps bent over against the sheet flanging; substantially as specified.

In testimony whereof I have hereunto set my hand.

THOMAS NATHAN RUSSELL.